US009332376B2

(12) United States Patent
Knaappila

(10) Patent No.: US 9,332,376 B2
(45) Date of Patent: May 3, 2016

(54) METHOD AND TECHNICAL EQUIPMENT FOR SHORT RANGE DATA TRANSMISSION

(71) Applicant: Silicon Laboratories Finland Oy, Espoo (FI)

(72) Inventor: Jere Knaappila, Evitskog (FI)

(73) Assignee: Silicon Laboratories Finland Oy (FI)

( * ) Notice: Subject to any disclaimer, the term of this patent is extended or adjusted under 35 U.S.C. 154(b) by 81 days.

(21) Appl. No.: 14/252,902

(22) Filed: Apr. 15, 2014

(65) Prior Publication Data

US 2014/0321321 A1 Oct. 30, 2014

(30) Foreign Application Priority Data

Apr. 30, 2013 (FI) ...................................... 20135446

(51) Int. Cl.
*H04L 12/28* (2006.01)
*H04W 4/00* (2009.01)
*H04J 3/16* (2006.01)
*H04B 7/00* (2006.01)
*G06F 15/16* (2006.01)
(Continued)

(52) U.S. Cl.
CPC ............. *H04W 4/008* (2013.01); *H04L 69/321* (2013.01); *H04W 8/005* (2013.01); *H04W 52/0209* (2013.01); *H04W 80/02* (2013.01); *Y02B 60/50* (2013.01)

(58) Field of Classification Search
CPC ..... H04W 4/008; H04W 8/005; H04W 48/16; H04W 52/0209; H04W 76/02; H04W 80/02; H04W 84/18; H04W 84/20; H04L 41/0803; H04L 41/0813; H04L 41/0823; H04L 41/12; H04L 63/0876; H04L 67/16; H04L 67/42; H04L 67/281; H04L 69/321; H04L 69/32; Y02B 60/50
USPC ................. 370/254–258, 310–350, 400–411, 370/449–463; 455/39–42, 403–466; 709/39–42, 403–466
See application file for complete search history.

(56) References Cited

U.S. PATENT DOCUMENTS 7,920,495 B2 * 4/2011 Salokannel ........... H04W 72/10 370/310
8,583,042 B2 * 11/2013 Cutrignelli ............ H04W 84/20 370/329

(Continued)

FOREIGN PATENT DOCUMENTS

EP 1195942 A2 4/2002

OTHER PUBLICATIONS

"Specification of the Bluetooth System, Specification vol. 6"; Jun. 30, 2010; pp. 2165-2300; Retrieved from the Internet: URL:https://www.bluetooth.org/docman/handlers/downloaddoc.ashx?doc_id=229737 on Jan. 12, 2012, pp. 40-41, pp. 59-66; pp. 105-106.

(Continued)

*Primary Examiner* — Tri H Phan
(74) *Attorney, Agent, or Firm* — Egan, Peterman, Enders & Huston LLP

(57) ABSTRACT

The invention relates to a method and a technical equipment for short range data transmission, e.g. Bluetooth low energy. The method comprises receiving, as a response to a transmitted advertisement packet, a scan request from a scanning device; reporting the scan request from a link layer to an application layer; determining a following action according to the scan request and performing the determined action.

18 Claims, 4 Drawing Sheets

(51) Int. Cl.
*H04W 8/00* (2009.01)
*H04W 52/02* (2009.01)
*H04L 29/08* (2006.01)
*H04W 80/02* (2009.01)

(56) References Cited

U.S. PATENT DOCUMENTS

| | | | | |
|---|---|---|---|---|
| 8,712,330 | B2 * | 4/2014 | Desai | H04B 17/318 370/318 |
| 8,929,192 | B2 * | 1/2015 | Kainulainen | G01S 3/48 342/147 |
| 9,042,829 | B2 * | 5/2015 | Palin | H04W 4/008 370/252 |
| 2007/0141988 | A1 | 6/2007 | Kuehnel et al. | |
| 2008/0109302 | A1 | 5/2008 | Salokannel et al. | |
| 2009/0234728 | A1 | 9/2009 | Willuns et al. | |
| 2013/0040574 | A1 | 2/2013 | Hillyard | |
| 2013/0165044 | A1 * | 6/2013 | Xie | H04W 52/0229 455/41.2 |
| 2014/0328210 | A1 * | 11/2014 | Knaappila | H04W 16/14 370/254 |
| 2015/0172391 | A1 * | 6/2015 | Kasslin | H04L 67/16 370/338 |
| 2015/0172901 | A1 * | 6/2015 | Kasslin | H04W 4/008 370/328 |
| 2015/0172902 | A1 * | 6/2015 | Kasslin | H04L 45/745 370/328 |
| 2015/0271629 | A1 * | 9/2015 | Knaappila | H04W 8/005 455/41.2 |
| 2015/0350334 | A1 * | 12/2015 | Liu | H04L 67/141 709/227 |
| 2015/0373749 | A1 * | 12/2015 | Palin | H04W 76/02 455/41.2 |

OTHER PUBLICATIONS

"Reconfigurable Radio Systems (RRS); Feasibility Study on Control Channels for Cognitive Radio Systems"; ETSI Draft; 03008V009, European Telecommunications Standards Institute (ETSI), 650, Route des Lucioles; France; No. V0.0.9, Feb. 6, 2012; pp. 1-42; retrieved on Feb. 6, 2012; section 7.1.1 and section 7.2.3.
Search Report, EP14397512.6, Jun. 26, 2014, 6 pgs.
Search Report Office Action, FI20135446, Feb. 10, 2014, 5 pgs.

* cited by examiner

METHOD AND TECHNICAL EQUIPMENT FOR SHORT RANGE DATA TRANSMISSION

CROSS-REFERENCE TO RELATED APPLICATIONS

This application claims priority under 35 USC §119 to Finnish Patent Application No. 20135446 filed on Apr. 30, 2013, which application is hereby incorporated by reference in its entirety.

TECHNICAL FIELD

The present application relates to Bluetooth modules. In particular the present application relates to Bluetooth low energy.

BACKGROUND

Bluetooth Low Energy (BLE) relates to Bluetooth wireless radio technology. It has been designed for low-power and low latency applications for wireless devices within short range. Today, typical BLE applications can be found from healthcare, fitness, security, smart energy, industrial automation and home entertainment. However, BLE is not limited only those, but increasingly more new applications utilizing BLE technology are designed.

The difference between BLE and classic Bluetooth is that the BLE devices consume remarkably less power for communication than classic Bluetooth devices. In addition, the BLE is able to start the data transmission much quicker than the classic Bluetooth. This makes it possible to have BLE devices constantly on and to communicate intermittently with other devices.

SUMMARY

The present application discloses a method and technical equipment implementing the method to improve the state of art by reducing over-the-air traffic between devices.

According to a first aspect, a method comprises receiving, as a response to a transmitted advertisement packet, a scan request from a scanning device; reporting the scan request from a link layer to an application layer; and determining a following action according to the scan request and performing the determined action.

According to a second aspect, an apparatus comprises a processor and a non-transitory memory, including computer program code, wherein the memory and the computer program code are configured to perform with the processor, cause the apparatus at least to receive, as a response to a transmitted advertisement packet, a scan request from a scanning device; to report the scan request from a link layer to an application layer; and to determine a following action according to the scan request and to perform the determined action.

According to a third aspect, a system comprises at least one advertising device and at least one scanning device, wherein said at least one advertising device is configured to receive, as a response to a transmitted advertisement packet, a scan request from said at least one scanning device; to report the scan request from a link layer to an application layer; and to determine a following action according to the scan request and to perform the determined action.

According to a fourth aspect, a computer program product embodied on a computer readable medium, comprises computer program code configured to, when executed on at least one processor, cause an apparatus or a system to receive, as a response to a transmitted advertisement packet, a scan request from a scanning device; to report the scan request from a link layer to an application layer; and to determine a following action according to the scan request and to perform the determined action.

According to an embodiment, the following action is to modify a scan response packet to be sent to the scanning device.

According to an embodiment, the following action is to modify an advertisement packet to be transmitted.

According to an embodiment, the following action is to select a certain scan response to be transmitted from a group of different scan response packets, which selection is based on the scan request.

According to an embodiment, the following action is to change an operation mode.

According to an embodiment, the scan request packet contains data on the address of scanning device.

According to an embodiment, the scan response packet contains data on the address of a target device for the scan request packet, and information on the services the target device for the scan request packet is able to provide.

According to an embodiment, the apparatus performing the method is a Bluetooth low energy enabled device.

DESCRIPTION OF THE DRAWINGS

In the following, various embodiments of the invention will be described in more detail with reference to the appended drawings, in which.

DESCRIPTION OF EXAMPLE EMBODIMENTS

Figure 1:
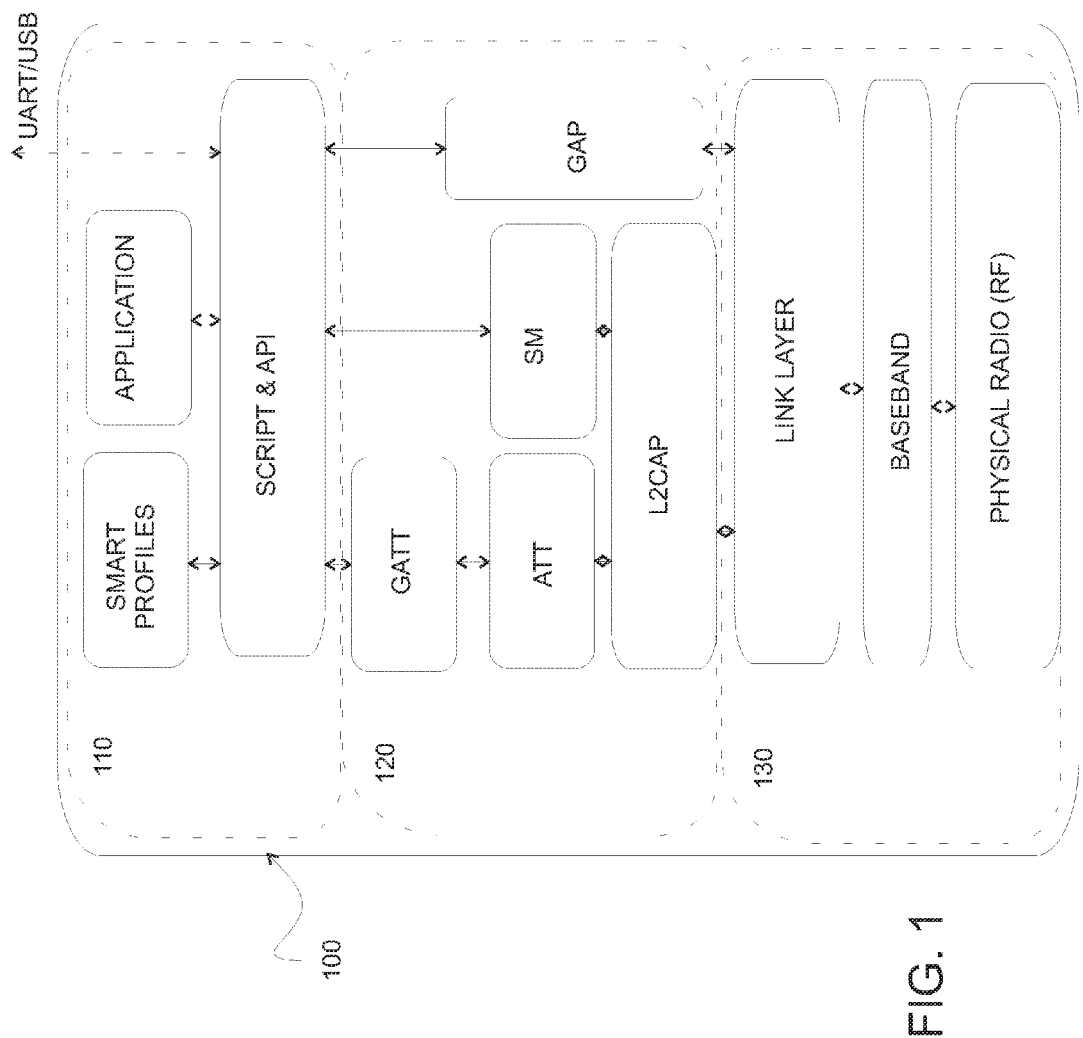
FIG. 1 shows a Bluetooth module according to an embodiment.

FIG. 1 illustrates an example of an electronic apparatus 100. According to an embodiment, the apparatus 100 is a Bluetooth module that comprises application layer 110, host layer 120 and a Bluetooth (or BLE) controller 130. The application layer 110 comprises the apparatus related (s) (e.g. heart rate, proximity, blood pressure, time update, temperature, battery, . . . ), smart profiles, script and application programming interface (API). The application is capable of reading sensor data e.g. from heart rate sensor, and reporting the data to host layer for transmitting the data by means of the Bluetooth (or BLE) controller 130. The host layer 120 comprises protocols running over the connection. Host layer 120 also comprises data to be used in advertisement packet. In FIG. 1, the host layer 120 is shown to comprise generic attribute profile (GATT), generic access profile (GAP), attribute protocol (ATT), security manager (SM) and logical link control and adaptation protocol (L2CAP). The Bluetooth (or BLE) controller 130 comprises link layer, baseband and physical layer (i.e. physical radio, radio frequency RF).

The link layer provides ultra-low power idle mode operation and device discovery (i.e. connection mode and advertising mode handling). The link layer also is in charge for packet transmission and responding.

Figure 2:
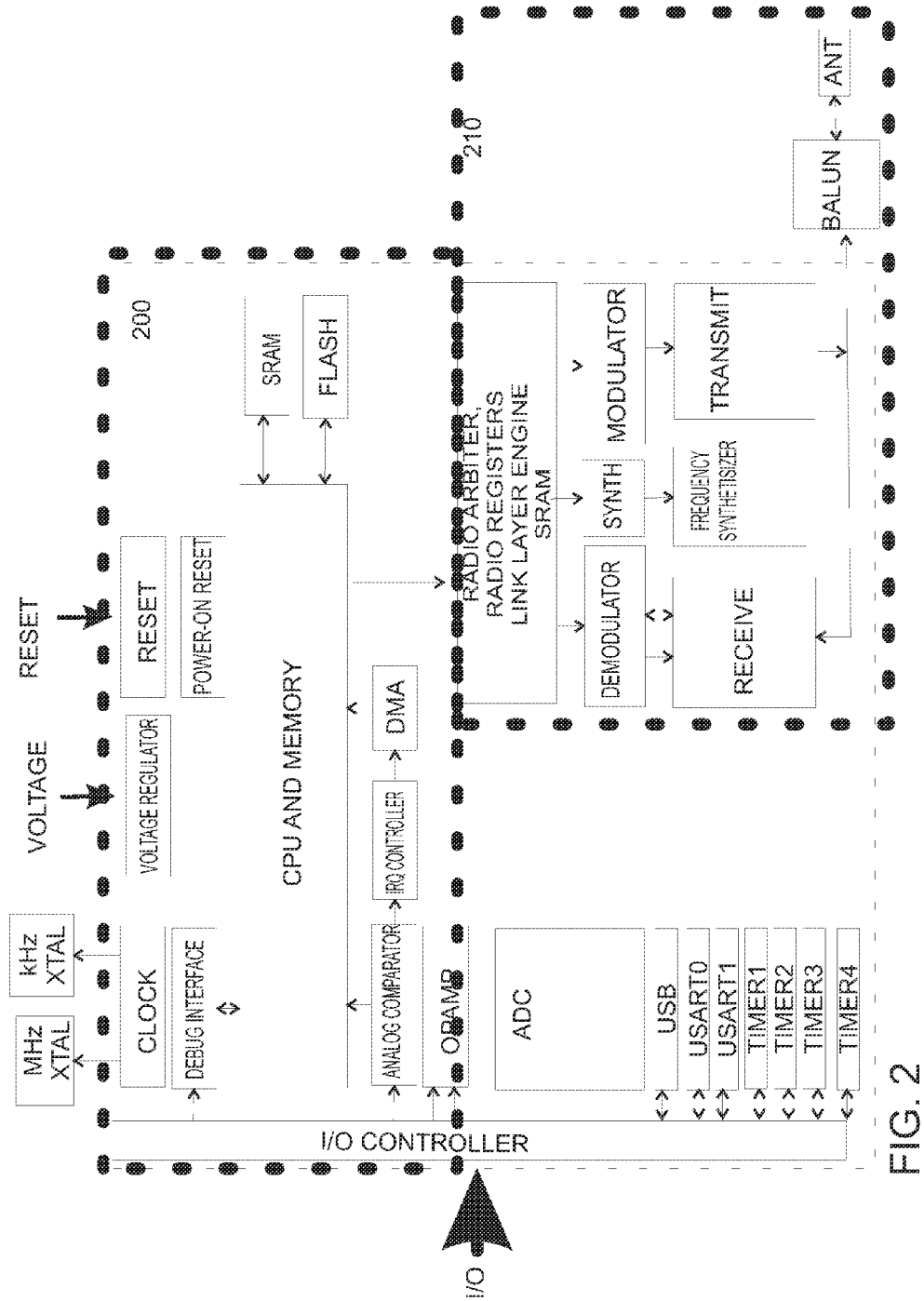
FIG. 2 shows a simplified block chart of a Bluetooth module.

FIG. 2 illustrates an example of a BLE module available on the market as a simplified block diagram. Central processing unit (processor) and a non-transitory memory including computer program code and with application data are located in segment 200. A part of the link layer and physical layer are illustrated with reference 210. This segment 210 contains elements, such as radio registers, link layer engine, modulator-demodulator, receiving-transmitting means, frequency synthesizer, balancing-unbalancing unit (balun), antenna (ant).

In BLE technology one or more slave devices can be connected to a master device. The master is able to communicate with one or more slave devices, also simultaneously. To let the master know about the slave devices, the slave devices (or at that point "advertisers") periodically, at pseudo-random intervals, pass advertisements packets which a scanner device (i.e. "scanner") is scanning.

Advertisement packet types from the apparatus are
ADV_IND connectable undirected advertising event
ADV_DIRECT_IND connectable directed advertising event
ADV_NONCONN_IND non-connectable undirected advertising event
ADV_DISCOVER_IND discoverable undirected advertising event Response packets to the advertisement packets are
SCAN_REQ scan request for further information from advertiser
CONNECT_REQ connect request by initiator When an advertising device receives SCAN_REQ from a scanning device, the advertising device may give more information to the scanning device by SCAN_RSP packet. SCAN_RSP packet may contain information on the name of the advertising device and on the services the advertising device is able to provide. However, SCAN_RSP packet is not limited to carry only this information but may contain other data as well or instead.

CONNECT_REQ packet contains data on transmit window size defining timing window for first data packet, transmit window offset that is off when the transmit window starts, connection interval is the time between connection events, slave latency defines number of times the slave can ignore connection events from the master, connection timeout is maximum time between two correctly received packets in the connection before link is considered to be lost, hop sequence is a random number appointing the starting point for a hop, channel map, CRC initialization value.

When the scanner is connected to an advertiser, the advertiser is called "a slave" and the scanner is called "a master". The state for passing advertisements packets is called "advertising state" and the state for connection is called "connected state". In both states, data transfer occurs. Slave device may be a sensor or an actuator, such as a temperature sensor, heart rate sensor, light bulb, proximity sensor etc. Master device can be any electronic device capable of collecting data, e.g. mobile phone, smart phone, personal digital assistant, personal computer, laptop computer, tablet computer, etc.

Packets sent from a slave device in advertising mode contains approximately 27 bytes of data and a slave address. Packets from master device in advertisement channel contains only a master address.

When an advertisement packet is successfully received by the master device, the master device can send a SCAN_REQ packet to the slave device. This SCAN_REQ packet indicates that the master device has received the advertisement data successfully. The SCAN_REQ packet is transmitted from the master device to the slave device in order to request more data.

Figures 3A, 3B:
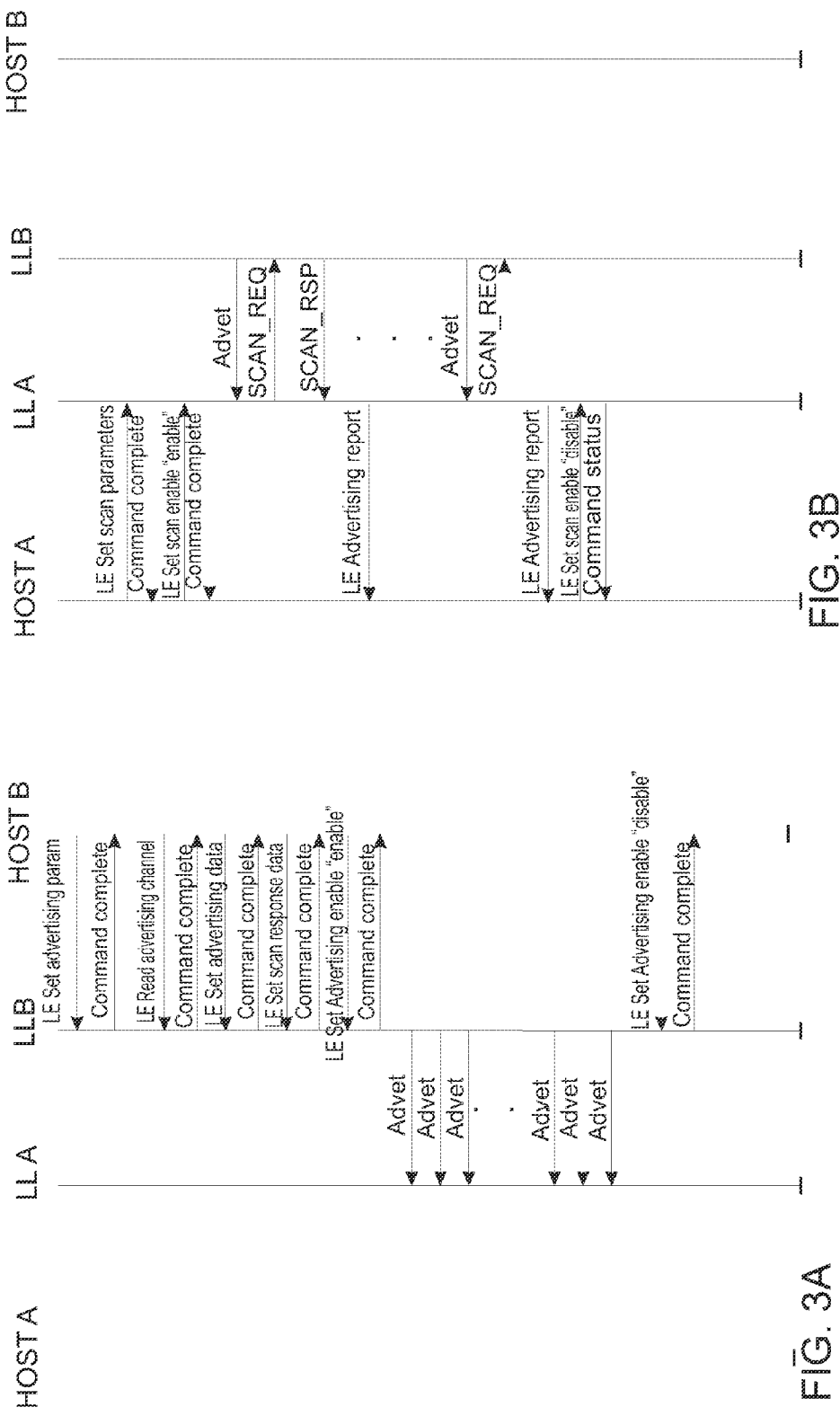
FIGS. 3*a*-3*b* shows an example of a state of art.

FIGS. 3a-3b illustrate prior art situations on advertising modes. FIG. 3a illustrates a setup of device B to send advertisement packets. FIG. 3b illustrates a situation where device B is sending packets and device A wishes to active scan. Host A and host B are a master device and a slave device respectively. LLA is link layer of the master device, i.e. host A, and LLB is link layer of the slave device, i.e. host B. From FIG. 3a it is realized that SCAN_REQ packet from host A as a response to an advertisement packet from link layer LLB of host B, is transmitted to link layer LLA of host B. As a response to SCAN_REQ packet, the link layer LLB of the host B sends a SCAN_RSP packet with data.

Connection between the master device and the slave device can be formed by the master device sending CONNECT_REQ packet after the slave advertisement packet. When the connection is opened, the slave device becomes aware with which device the connection is formed.

However, before the connection is formed, there is no indication to the slave device that the master device has received any advertisement packets. This means that SCAN_REQ packet is not reported outside the BLE chip of the device, whereby the slave device does not know if the advertisement packet was received and by who.

The present embodiments improve the previous by enabling the application of the slave device to know that a master device has received an advertisement packet. For that, a device in advertising mode reports SCAN_REQ messages to the application layer, so that the application can reliable detect that data in the advertisement packet was received by a certain device.

Figure 4:
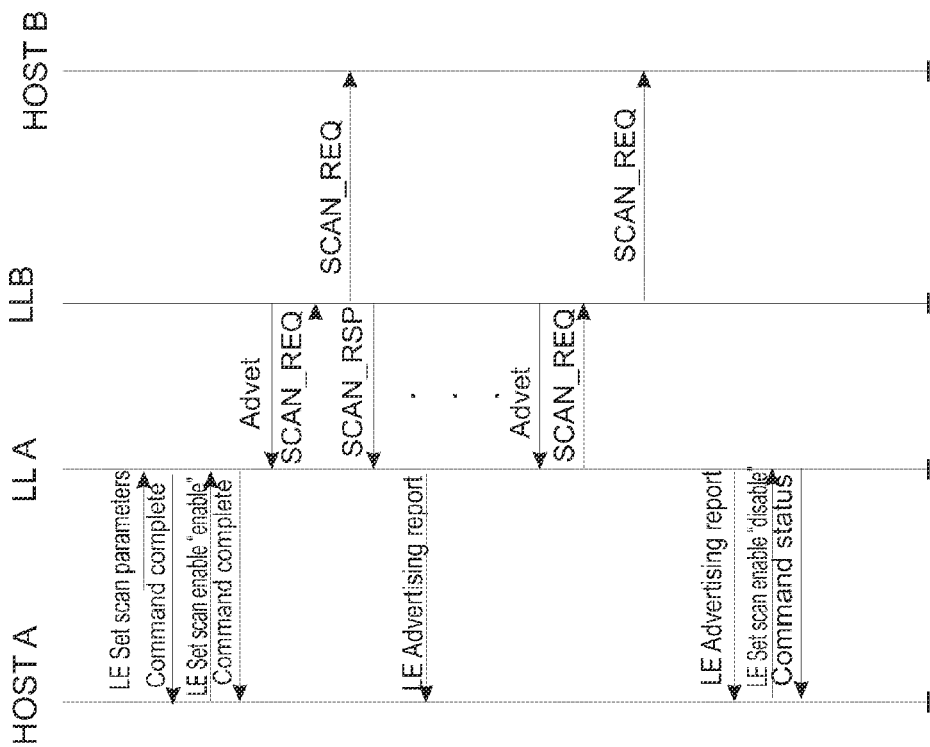
FIG. 4 shows an example of the present solution.

This is illustrated in FIG. 4. FIG. 4 resembles FIG. 3b, but differentiates in that the SCAN_REQ being received from link layer LLA of host A is further transmitted from link layer LLB of host B. Now it is not only the link layer LLB, or BLE module (FIG. 1: 130), that is aware of that host A received an advertisement packet, but also the application layer (FIG. 1: 110) knows it.

SCAN_REQ contains scanner's and advertiser's address, meaning that there is no payload. Scanner address as such is useful, but there are some metadata, e.g. channel and receiving time for the packet. The metadata may also be sent to upper layer, i.e. application layer. The application logic may be divided in to layers, but also link layer may process the SCAN_REQ packet, in addition to just sending SCAN_RSP.

The present embodiments propose using information, such as master address being obtained from SCAN_REQ packet to control application layer logic. Therefore, the application is able to determine, what kind of data should be put to the advertisement packet or whether to advertise at all. The SCAN_RSP packet may be modified before transmission to the scanner. However, because the SCAN_RSP should be send within 150 µs from receiving the SCAN_REQ, the processing time for SCAN_RSP packet is very small. As an alternative, the link-layer may contain different kinds of SCAN_RSP packets for different SCAN_REQ (i.e. transmitted from different addresses) packets.

When an apparatus (such as an apparatus 100 in FIG. 1) knows that data has been received by another device, the apparatus changes its operation. How the operation is changed, depends on the type of the Bluetooth low energy enabled device, i.e. an apparatus comprising the Bluetooth low energy module.

In an example, a thermometer is configured to slow down the advertising and go to power-save mode. After, for example, an hour, the thermometer can wake up and start advertising again. This can be implemented as follows: The thermometer has an application (FIG. 1: 110) running. The application 110 receives the measurement in every hour, reports it to GAP 120 and asks GAP 120 to enter to advertising mode. GAP generates an advertisement packet containing the temperature and transmits the packet to link layer with a command to start advertising in every 100 ms. At some point, a mobile terminal or another scanning device being interested in this temperature scans the packet and sends an SCAN_REQ packet to the thermometer. Link-layer of thermometer receives the SCAN_REQ packet and informs either GAP or the application layer directly on it. The application layer notices that a certain scanner has received an information on the temperature, after which it turns down the advertising mode to save power.

The above description is an example on the procedure and the device. However, it is appreciated that the principle of the invention may be utilized by any other device as well. What is important, is that the device determines the following action to be performed based on the SCAN_REQ packet being received and then performs the action. The action may be either changing the operation mode from an advertising mode to a power-save mode or vice versa, or the action may be to modify or select a certain SCAN_RSP packet to be transmitted as a response.

It is also realized that just receiving SCAN_REQ packet is information which indicates that somebody has received the data. According to an embodiment, for notifying the slave application that the master device has received the transmitted advertisement packet, a metadata from advertisement channel may be used.

The various embodiments may provide advantages. For example, over the air traffic can be reduced, because only two packets is needed for indicating that an advertisement packet has been received. Also, by the present embodiments, power can be saved, because the advertising device can stop advertising and go to the sleep mode after having received an indication that someone has received its advertisement packet.

The various embodiments of the invention can be implemented with the help of computer program code that resides in a memory and causes the relevant apparatuses to carry out the invention.

It is obvious that the present invention is not limited solely to the above-presented embodiments, but it can be modified within the scope of the appended claims.

While there have been shown and described and pointed out fundamental novel features of the invention as applied to preferred embodiments thereof, it will be understood that various omissions and substitutions and changes in the form and details of the devices and methods described may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto. Furthermore, in the claims means-plus-function clauses are intended to cover the structures described herein as performing the recited function and not only structural equivalents, but also equivalent structures. Thus although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method, comprising receiving, as a response to a transmitted advertisement packet, a scan request from a scanning device, wherein the scan request does not include a payload; reporting the scan request from a link layer to an application layer; and after reporting the scan request to an application layer, determining a following action according to the scan request and performing the determined action.

2. The method according to claim 1, wherein the following action is to modify a scan response packet to be sent to the scanning device.

3. The method according to claim 2, wherein the scan response packet contains data on the address of a target device for the scan request packet, and information on the services the target device for the scan request packet is able to provide.

4. The method according to claim 1, wherein the following action is to modify an advertisement packet to be transmitted.

5. The method according to claim 1, wherein the following action is to select a certain scan response to be transmitted from a group of different scan response packets, which selection is based on the scan request.

6. The method according to claim 1, wherein the following action is to change an operation mode.

7. The method according to claim 1, wherein the scan request packet contains data on the address of scanning device.

8. The method according to claim 1, wherein the method is carried out in a Bluetooth low energy enabled device.

9. An apparatus, comprising a processor and a non-transitory memory including computer program code, wherein the memory and the computer program code are configured to perform with the processor, cause the apparatus at least to receive, as a response to a transmitted advertisement packet, a scan request from a scanning device, wherein the scan request does not include a payload; report the scan request from a link layer to an application layer; and after reporting the scan request to an application layer, to determine a following action according to the scan request and perform the determined action.

10. The apparatus according to claim 9, wherein the following action is to modify a scan response packet to be sent to the scanning device.

11. The apparatus according to claim 10, wherein the scan response packet contains data on the address of a target device for the scan request packet, and information on the services the target device for the scan request packet is able to provide.

12. The apparatus according to claim 9, wherein the following action is to modify an advertisement packet to be transmitted.

13. The apparatus according to claim 9, wherein the following action is to select a certain scan response to be transmitted from a group of different scan response packets, which selection is based on the scan request.

14. The apparatus according to claim 9, wherein the following action is to change an operation mode.

15. The apparatus according to claim 9, wherein the scan request packet contains data on the address of scanning device.

16. The apparatus according to claim 9, wherein the apparatus is a Bluetooth low energy enabled device.

17. A system, comprising at least one advertising device and at least one scanning device, wherein said at least one advertising device is configured to receive, as a response to a transmitted advertisement packet, a scan request from said at least one scanning device, wherein the scan request does not include a payload; report the scan request from a link layer to an application layer; and after reporting the scan request to an application layer, to determine a following action according to the scan request and perform the determined action.

18. A computer program product embodied on a non-transitory computer readable medium, comprising computer program code configured to, when executed on at least one processor, cause an apparatus or a system to: receive, as a response to a transmitted advertisement packet, a scan request from a scanning device, wherein the scan request does not include a payload; report the scan request from a link layer to an application layer; and after reporting the scan request to an application layer, to determine a following action according to the scan request and perform the determined action.

* * * * *